United States Patent
Muncy et al.

(10) Patent No.: US 9,417,154 B2
(45) Date of Patent: Aug. 16, 2016

(54) MONITORING A RESPONSE OF A BRIDGE BASED ON A POSITION OF A VEHICLE CROSSING THE BRIDGE

(71) Applicant: Trimble Navigation Limited, Sunnyvale, CA (US)

(72) Inventors: Darin Muncy, Thornton, CO (US); Curt Conquest, Longmont, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 120 days.

(21) Appl. No.: 14/282,822

(22) Filed: May 20, 2014

(65) Prior Publication Data

US 2015/0338305 A1    Nov. 26, 2015

(51) Int. Cl.
*G01M 5/00* (2006.01)

(52) U.S. Cl.
CPC .......... *G01M 5/0008* (2013.01); *G01M 5/0066* (2013.01); *G01M 5/0091* (2013.01)

(58) Field of Classification Search
CPC ............. G01N 3/10; G01N 3/40; G01N 3/00; E02D 1/04; E02D 1/022; G01H 1/10; G01M 7/00; G01M 5/0041; G01M 5/0083; G01M 5/0008; G01M 5/0066; G01G 19/024; G06T 5/00; G06T 7/00; G06F 17/50
USPC .................................... 73/786, 784, 794, 825
See application file for complete search history.

(56) References Cited

U.S. PATENT DOCUMENTS

| | | | | |
|---|---|---|---|---|
| 5,122,957 A | * | 6/1992 | Hattori | G05D 1/0221 382/153 |
| 6,067,111 A | * | 5/2000 | Hahn | B60R 16/0237 340/901 |
| 7,583,816 B2 | * | 9/2009 | Kakinami | G06K 9/00798 382/103 |
| 9,171,363 B2 | * | 10/2015 | Suzuki | G06T 7/00 |
| 2011/0221906 A1 | * | 9/2011 | Xu | G01N 21/8806 348/148 |
| 2013/0173208 A1 | * | 7/2013 | Kuzunishi | E01C 23/01 702/141 |
| 2014/0026671 A1 | * | 1/2014 | Petschacher | G01G 19/024 73/786 |

OTHER PUBLICATIONS

Matta et al., "In-situ Load Testing of Bridge A6358 (Part 1) and of Bridge A6101 and Bridge A6102 (Part 2)" MoDOT Research, Development and Technology, University of Missouri-Rolla (Feb. 2005) 75 pages.
Burdet et al., "Dynamic Load Testing of Swiss Bridges" Essais dynamiques des ponts Suisses, Swiss Federal Institute of Technology, Switzerland, (retrieved from www.google on Aug. 27, 2014) 6 pages.

* cited by examiner

*Primary Examiner* — Harshad R Patel
*Assistant Examiner* — Brandi N Hopkins
(74) *Attorney, Agent, or Firm* — Kilpatrick Townsend & Stockton LLP (57) ABSTRACT

A method for performing a dynamic load test on a bridge includes providing a vehicle with an imaging device coupled to the vehicle and moving the vehicle across the bridge. While moving the vehicle across the bridge, a series of images is obtained using the imaging device. A position of the vehicle on the bridge is determined as a function of time using the series of images, and a response of the bridge is determined as a function of time as the vehicle crosses the bridge. The position of the vehicle on the bridge is associated with the response of the bridge.

20 Claims, 7 Drawing Sheets

MONITORING A RESPONSE OF A BRIDGE BASED ON A POSITION OF A VEHICLE CROSSING THE BRIDGE

FIELD OF THE INVENTION

Embodiments described herein relate generally to methods for monitoring a response of a bridge based on a position of a vehicle crossing the bridge. The methods are particularly useful for dynamic load testing of a bridge.

BACKGROUND

Bridges are often tested to determine how they respond to a load. The load is generally provided using a vehicle such as a heavily loaded truck. The information obtained from these tests can be used for a number of purposes, such as determining if the bridge is safe for traffic, determining a load carrying capacity, and determining maintenance or repair schedules for the bridge. Static tests may be performed by moving the vehicle to different positions on the bridge and measuring a response. The response may be a deflection of the bridge or another type of strain measurement. Dynamic tests may be performed by moving the vehicle over the bridge and measuring the response as it crosses. In this case, deflection or strain may again be measured, or a dynamic response, such as a frequency of deflection, may be measured. The static information is generally easier to obtain, but the dynamic information is generally preferred because it provides information that is more closely related to actual use of the bridge. Thus, improved methods for dynamic load testing of bridges are continually desired.

SUMMARY

Embodiments described herein provide improved methods for monitoring a response of a bridge based on a position of a vehicle crossing the bridge. The vehicle may include an imaging device for obtaining image information. The image information may be used to determine the position of the vehicle on the bridge as a function of time. As the vehicle crosses the bridge, response measurements can also be obtained as a function of time. The position information can be associated with the response measurements to provide test results. As described more fully below, the image information can be used in a number of ways to provide accurate position information.

In accordance with an embodiment, a method of monitoring movement of a bridge based on a position of a vehicle crossing the bridge includes providing the vehicle with an imaging device coupled to the vehicle. The imaging device is configured to obtain image information. While moving the vehicle across the bridge, a series of images is obtained using the imaging device. A portion of a scene in a first image in the series overlaps with a portion of a scene in a next image in the series, a portion of a scene in a last image in the series overlaps with a portion of a scene in a previous image, and each image between the first image and the last image has a portion of a scene that overlaps with at least a portion of a scene in both a previous image and a subsequent image. For each pair of adjacent images in the series, a distance traveled by the vehicle between points at which the pair of adjacent images were captured is determined using common features in an overlapping portion in the pair of adjacent images. The position of the vehicle on the bridge is determined as a function of time using the distance traveled between each pair of adjacent images and a period of time between capturing each pair of adjacent images, and the movement of the bridge is determined as a function of time as the vehicle crosses the bridge. The position of the vehicle on the bridge is associated with the movement of the bridge.

In an embodiment, the imaging device may be coupled to the vehicle at a known height and arranged in a downward facing orientation. The imaging device may be calibrated so that the distance traveled by the vehicle between each pair of adjacent images is determined based on a number of image pixels by which features move between the pair of adjacent images.

In another embodiment, traffic markings on the bridge may have one or more known dimensions, and the imaging device may be arranged in a downward facing orientation so that portions of the traffic markings are captured in the series of images. The distance traveled by the vehicle between the points at which each pair of adjacent images are captured may be determined based on a change in position of the traffic markings between the pair of adjacent images. In some embodiments, the markings may include a centerline stripe, and the one or more known dimensions may include at least one of a length or width of the centerline stripe.

In another embodiment, traffic markings on the bridge may have one or more known dimensions and spacings, and the imaging device may be arranged in a downward facing orientation so that portions of the traffic markings are captured in the series of images. The distance traveled by the vehicle between each pair of adjacent images may be determined based on a number of the traffic markings in the pair of adjacent images.

In another embodiment, features on the bridge may have one or more known dimensions, and the imaging device may be arranged so that portions of the features are captured in the series of images. The distance traveled by the vehicle between each pair of adjacent images may be determined based on a change in position of the features between the pair of adjacent images. In some embodiments, the features may be disposed on a side rail of the bridge, and the imaging device may be arranged to capture at least a portion of the features as the vehicle crosses the bridge. In other embodiments, the features may comprise rails that are spaced at regular intervals across a length of the bridge.

In another embodiment, the movement of the bridge includes a frequency of deflection.

In another embodiment, each image in the series of images includes a timestamp that is used to determine the position of the vehicle on the bridge as the function of time.

In yet another embodiment, each image in the series of images is captured at a regular time interval, and the regular time interview is used to determine the position of the vehicle on the bridge as the function of time.

In accordance with another embodiment, a method for performing a dynamic load test on a bridge includes providing a vehicle with an imaging device coupled to the vehicle and moving the vehicle across the bridge. While moving the vehicle across the bridge, a series of images is obtained using the imaging device. A position of the vehicle on the bridge is determined as a function of time using the series of images, and a response of the bridge is determined as a function of time as the vehicle crosses the bridge. The position of the vehicle on the bridge is associated with the response of the bridge.

In an embodiment, at least one image in the series of images includes an object indicating a start point near a beginning of the bridge, and at least one image in the series of images includes an object indicating a stop point near an end of the bridge. Some of the images in the series include markings that either have one or more known dimensions or are spaced by a known distance. The position of the vehicle on the bridge as a function of time is determined based on a number of the markings in the series of images between the at least one image that includes the object indicating the start point and each subsequent image in the series of images.

In an embodiment, the response of the bridge includes a deflection of the bridge.

In another embodiment, the response is determined using one or more strain gauges coupled to the bridge.

In accordance with yet another embodiment, a method of monitoring a strain on a bridge based on a position of a vehicle crossing the bridge includes providing the vehicle with an imaging device coupled to the vehicle. The imaging device may be calibrated to provide a relationship between a coordinate frame associated with the imaging device and a coordinate frame associated with each image of a series of images. While moving the vehicle across the bridge, a series of overlapping images is obtained using the imaging device. The series of overlapping images is used to determine a position of the vehicle on the bridge as a function of time, and the strain on the bridge as a function of time is determined as the vehicle crosses the bridge. The position of the vehicle on the bridge is associated with the strain on the bridge.

Numerous benefits are achieved using embodiments described herein over conventional techniques. For example, some embodiments use image information to determine a position of a vehicle crossing a bridge. The image information can be used to provide accurate position information. The image information is not subject to interference from support structures on the bridge like some other positioning techniques such as global navigation satellite system (GNSS) measurements. Also, the imaging information can be obtained and processes at a relatively low cost compared to other positioning techniques. Depending on the embodiment, one or more of these benefits may exist. These and other benefits are described throughout the specification with reference to the drawings.

DETAILED DESCRIPTION

Embodiments described herein provide methods for monitoring a response of a bridge based on a position of a vehicle crossing the bridge. The response may include a movement of the bridge such as a deflection (e.g., vertical deflection) or strain on the bridge and may include frequency response measurements. The position of the vehicle may be determined using image information so that the position can be associated with the response measurements.

Figure 1:
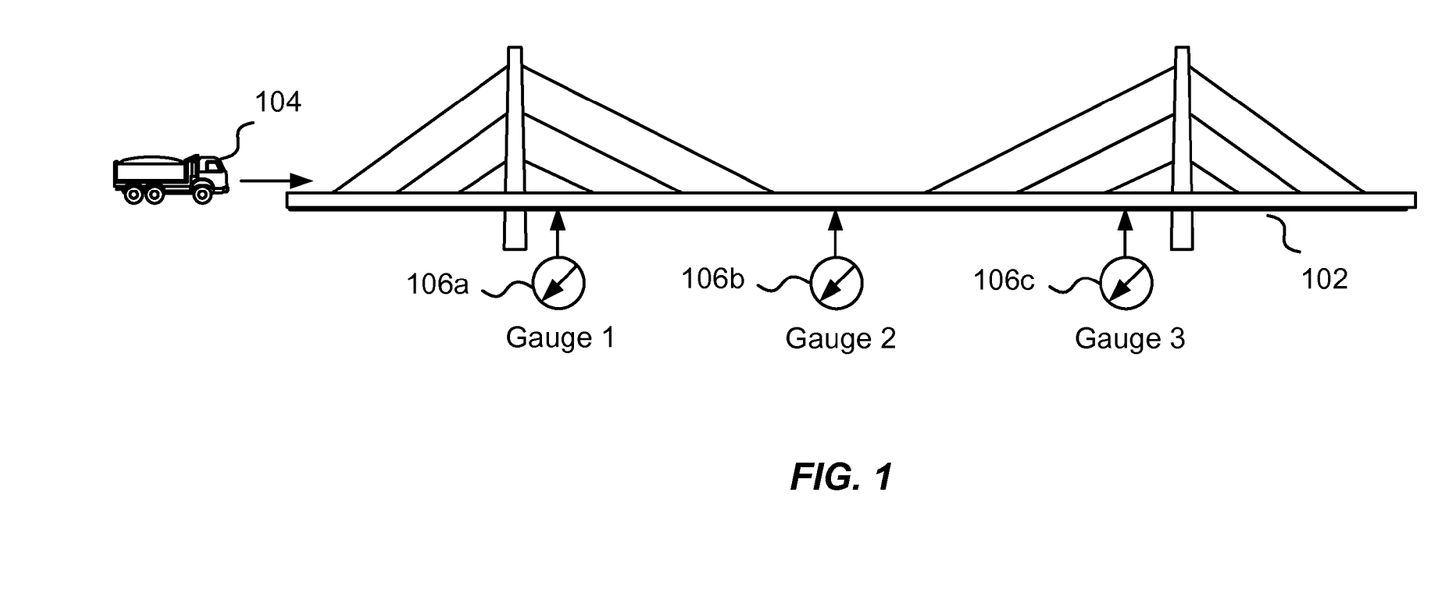
FIG. 1 is a simplified diagram of a bridge with gauges for dynamic load testing in accordance with some embodiments.

FIG. 1 is a simplified diagram of a bridge 102 with gauges 106a, 106b, 106c for dynamic load testing in accordance with some embodiments. This figure shows a vehicle 104 that is approaching the bridge 102 to cross it. The gauges 106a, 106b, 106c are positioned at different locations on the bridge so that a response can be measured at each of the locations as the vehicle 104 crosses the bridge 102. This figures shows a suspension bridge 102 with three gauges 106a, 106b, 106c merely as an example, and other types of bridges (including beam bridges, girder bridges, arch bridges, truss bridges, and the like) and other numbers and/or locations of gauges may be used with the embodiments described herein (including one gauge). The bridge 102 may be formed using various types of construction materials such as concrete, steel, wood, and the like, and methods of construction may include forming pretensioned members, post tensioned members, and the like.

The gauges 106a, 106b, 106c may be any type of deflection or strain gauge and may be coupled to the bridge 102 or arranged separate from the bridge 102. For example, deflection of the bridge may be measured using a surveying apparatus such as a total station disposed remote from the bridge 102. The surveying apparatus may use targets coupled to the bridge or may use a particular point or structure on the bridge 102 for measurements. Using such a gauge, a vertical deflection of the bridge can be measured as a function of time as the vehicle 104 crosses the bridge. As another example, sensors may be coupled to the bridge 102 and/or embedded within the bridge 102 to measure strain as the vehicle 104 crosses the bridge 102. Other types of gauges may also be used such as mechanical dial gauges, linear potentiometers, linear variable differential transducers, and the like. In some embodiments, multiple gauges may be used that monitor different locations on the bridge 102 or a single gauge may be used that is moved to different locations on the bridge 102. In the latter case, the vehicle 104 may cross the bridge 102 multiple times so that the response can be measured at each of the different locations.

The vehicle 104 may be any type of vehicle. In some scenarios, different types of vehicles having different weights may be used to compare the response of the bridge 102 to different loads. For some tests, it may be desirable to place an object such as a metal plate on the bridge so that the response of the bridge as the vehicle 104 travels over the object can be monitored.

Figure 2A:
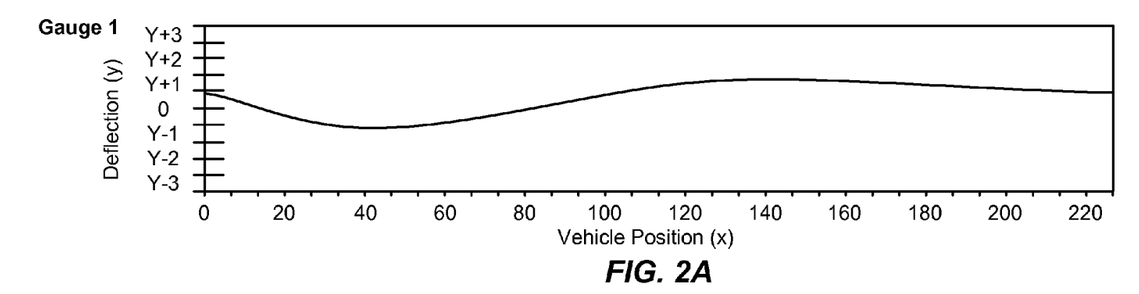
FIGS. 2A-2C are exemplary plots showing a response of a bridge as a function of vehicle position as measured by the gauges shown in FIG. 1.
Figure 2B:
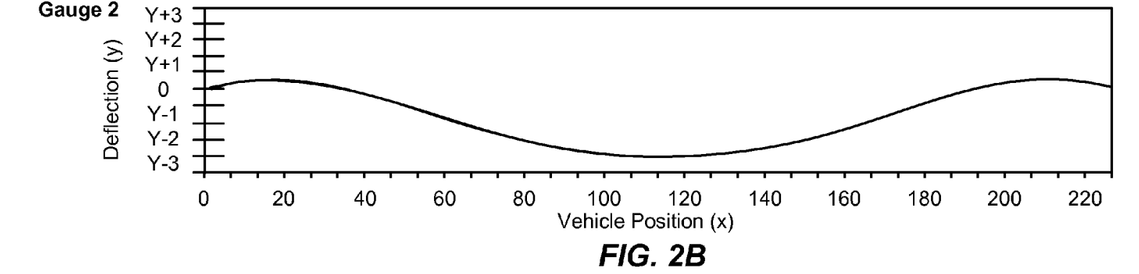
Figure 2C:
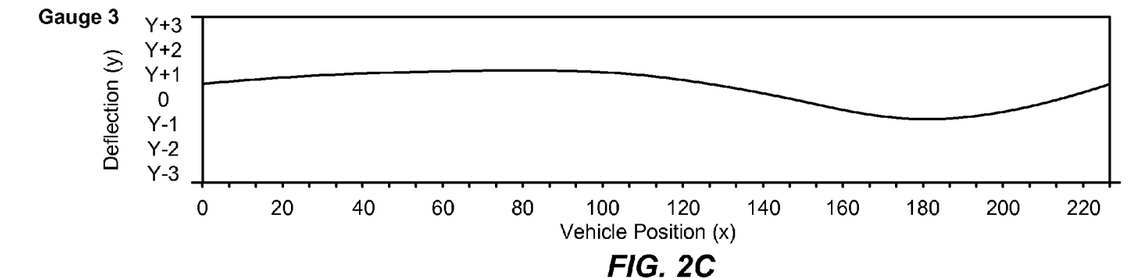

FIGS. 2A-2C are exemplary plots showing a response of a bridge as a function of a position of a vehicle as measured by the gauges 106a, 106b, 106c shown in FIG. 1. These plots are shown merely as examples. The x-axis is the position of the vehicle on the bridge measured in distance from a starting position (or from a beginning of the bridge). The y-axis is the vertical displacement of the bridge. The gauges 106a, 106b, 106c may be used to measure a response of different parts of the bridge, such as the bridge deck, the substructure, the superstructure, piers, abutments, girders, pillars, caps, the approach slab, and so forth. The plots shown in this example illustrate that for each gauge, a maximum deflection occurs approximately when the vehicle passes over the location of each gauge (e.g., the maximum deflection measured by Gauge 1 occurs approximately when the vehicle passes over the location of Gauge 1; the maximum deflection measured by Gauge 2 occurs approximately when the vehicle passes over the location of Gauge 2; and the maximum deflection measured by Gauge 3 occurs approximately when the vehicle passes over the location of Gauge 3).

Figure 3:
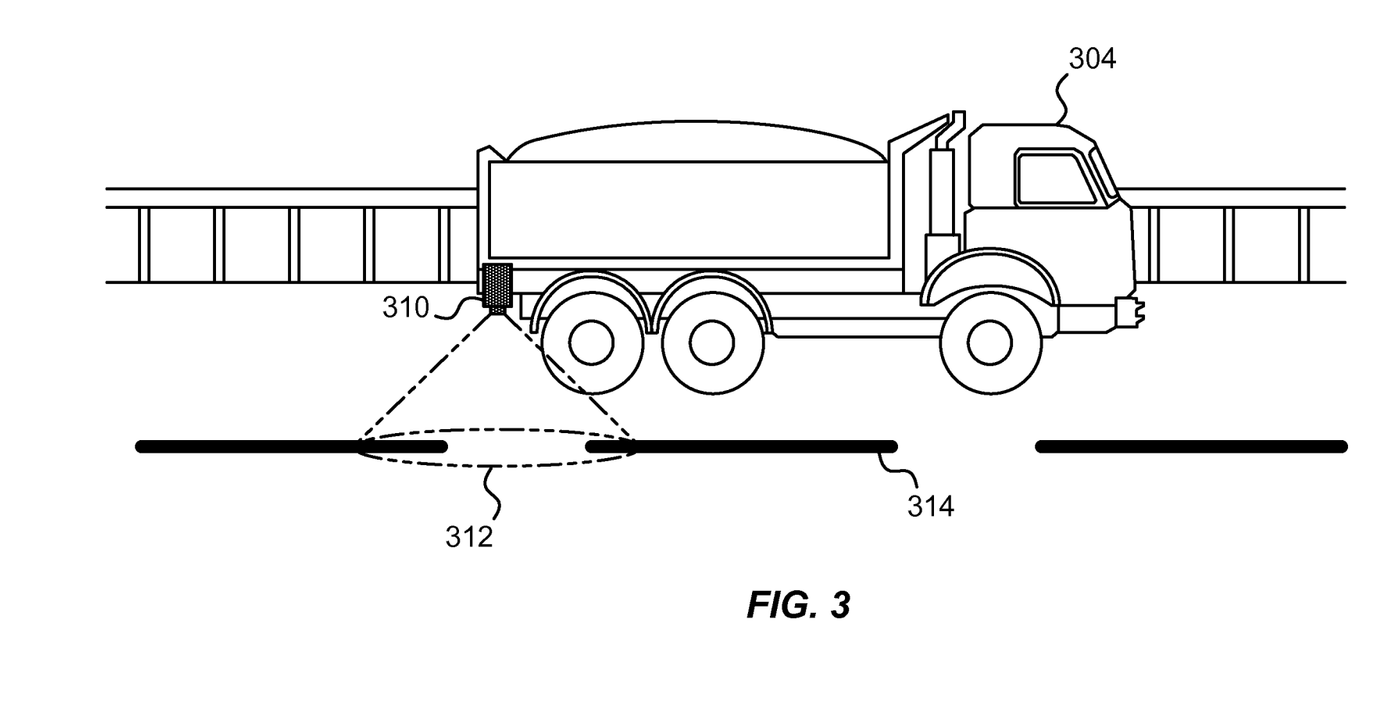
FIG. 3 is a simplified diagram illustrating a method of determining a position of a vehicle on a bridge in accordance with some embodiments.

FIG. 3 is a simplified diagram illustrating a method of determining a position of a vehicle 304 on a bridge in accordance with some embodiments. In this example, an imaging device 310 is coupled to the vehicle 304 and arranged in a downward facing orientation. The imaging device 310 may be arranged so that traffic markings (such as centerline stripes 314) are within a field of view 312 of the imaging device 310. Although the imaging device 310 is coupled to a rear portion of the vehicle 304 in this example, embodiments described herein are not so limited and the imaging device 310 may be coupled to any portion of the vehicle 304 or to any support (e.g., extension arm) that is coupled to the vehicle 304.

The imaging device 310 may be used to obtain a series of images as the vehicle 304 crosses the bridge. The imaging device 310 may be a digital camera, a digital video camera, a digital camcorder, a digital stereo camera, or the like. The series of images may be used to determine a position of the vehicle 304 on the bridge as a function of time. A response can also be measured as a function of time, so that the response as a function of vehicle position can be provided as illustrated in the plots shown in FIGS. 2A-2C.

In some embodiments, the series of images may be overlapping. For example, a portion of a scene in a first image in the series may overlap with a portion of a scene in a next image in the series, a portion of a scene in a last image in the series may overlap with a portion of a scene in a previous image, and each image between the first image and the last image may have a portion of a scene that overlaps with at least a portion of a scene in both a previous image and a subsequent image.

The position of the vehicle 304 on the bridge may be determined using any one of a number of image processing techniques. For example, in one embodiment, the imaging device is coupled to the vehicle 304 at a known height above the ground and calibrated so that the distance traveled by the vehicle 304 between each pair of adjacent images is determined based on a number of image pixels by which common features move between the pair of adjacent images. The features may be traffic markings such as the centerline stripes 314 or simply points and/or structure that can be detected using known feature tracking techniques. Examples of features include points, regions, contours, textures, and/or the like. Pairs of adjacent images may include immediately adjacent images in the series, or images in the series that include common features and that may or may not include one or more intervening images.

The imaging device 310 may be calibrated using an object (or part of an object) having one or more known dimensions. As an example, the object may be a centerline stripe 314 and the one or more known dimensions may be a length and/or a width of the centerline stripe 314 or a spacing between the stripes 314. An image of the object may be obtained either in one of the images in the series or in a separate image. Using the one or more known dimensions, a unit distance on the ground may be determined per pixel in the images (e.g., inches per image pixel).

Alternatively, the imaging device 310 may be calibrated to establish a mapping between a camera coordinate frame and an image coordinate frame. This calibration is generally an infrequent procedure carried out at the time the imaging device 310 is manufactured or when it is suspected that the optics have gone out of calibration (e.g., from rough handling). Calibration of the imaging device 310 may be performed in accordance with known techniques. As an example, mapping of an ideal lens may be defined by the following equations:

$$x_p - x_0 = f\frac{X}{Z} \tag{1}$$

$$y_p - y_0 = f\frac{Y}{Z} \tag{2}$$

where $x_p$, $y_p$ is a position in an image plane; X, Y, Z is a corresponding three-dimensional position with respect to the camera coordinate frame; $x_0$, $y_0$ is the principal point; and f is the focal length of the imaging device 310. Accordingly, normalized image coordinates x, y for an ideal (undistorted) lens may be defined as:

$$x = \frac{x_p - x_0}{f} \tag{3}$$

$$y = \frac{y_p - y_0}{f} \tag{4}$$

Conventional calibration models generally depart from the ideal state to account for distortion. For example, a first order radial distortion may be modeled as:

$$x = x_d(1 + k(x_d^2 + y_d^2)) \tag{5}$$

$$y = y_d(1 + k(x_d^2 + y_d^2)) \tag{6}$$

where $x_d$, $y_d$ is a position in a distorted image plane, and k is the coefficient of radial distortion. Other models may be used in accordance with known techniques.

In another embodiment, traffic markings captured in the images may have one or more known dimensions, and the distance traveled by the vehicle 304 between each pair of adjacent images is determined based on a number of the traffic markings in the pair of adjacent images. For example, the centerline stripes 314 may have a known length and a known spacing, and a distance traveled by the vehicle 314 may be determined based on the number of stripes in the series of images or in a portion of the images.

In each of the embodiments described herein, an object captured in at least one image may be used to mark a beginning of the bridge, and another objected captured in at least one image may be used to mark an end of the bridge. Merely by way of example, a line (or series of lines) may be painted on the bridge so that the beginning and ending of the bridge may be determined from the images. The position of the vehicle is generally determined in distance from a particular point in at least one of the images such as the beginning of the bridge or from another object in at least one of the images.

The images are generally associated with a time so that a position of the vehicle on the bridge can be determined as a function of time. This allows the position to be associated with a response measurement that is also obtained as a function of time. In some embodiments, each image has a timestamp, and the position of the vehicle can be matched to the response measurement using the timestamps. In other embodiments, a total time that it takes the vehicle to travel from a beginning of the bridge to an end of the bridge may be determined and divided based on the number of images in the series. In yet other embodiments, the images may be captured at a regular time interval, and the time interval can be used to determine the position of the vehicle as a function of time. Other methods of associating time with vehicle position may also be used.

The series of images provide a means for accurately determining a position of the vehicle on the bridge as a function of time. It is not required that the vehicle cross the bridge at a constant velocity. Instead, the vehicle may vary its speed as it crosses the bridge and the series of images allow the position to be determined and matched with respective response measurements.

Figure 4:
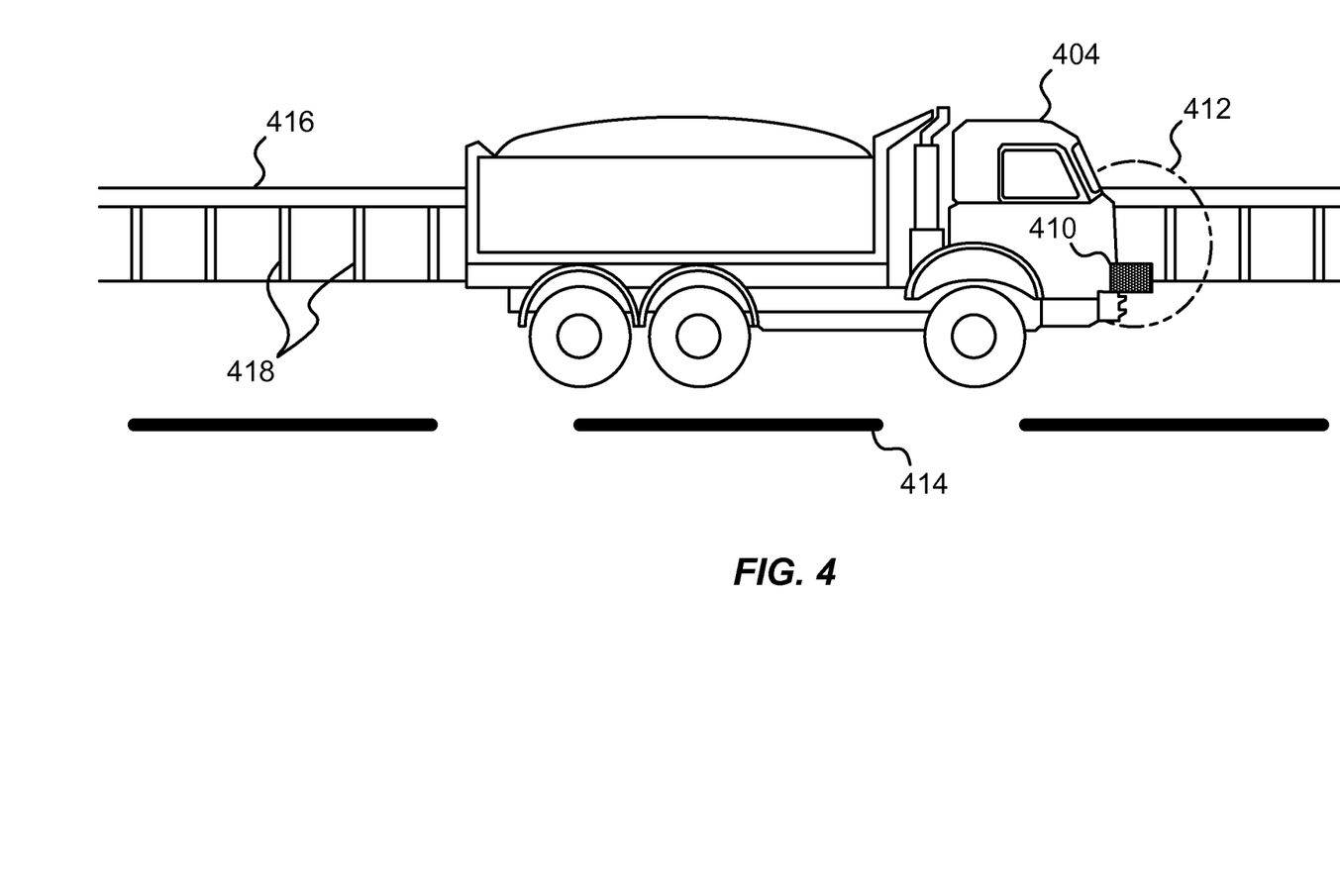
FIG. 4 is a simplified diagram illustrating a method of determining a position of a vehicle on a bridge in accordance with other embodiments.

FIG. 4 is a simplified diagram illustrating a method of determining a position of a vehicle 404 on a bridge in accordance with other embodiments. This example is similar to that described above with regard to FIG. 3, except that in this example an imaging device 410 is coupled to the vehicle 404 and arranged in a sideways facing orientation. The imaging device 410 may be arranged so that traffic markings (such as rails 418 of side rail 416) are within a field of view 412 of the imaging device 410. Alternatively, the traffic markings may be reflectors or targets disposed on the side rail 416. A series of images may be obtained as the vehicle 404 crosses the bridge, and the rails 418 may be used to determine the position of the vehicle 404 on the bridge in a manner similar to that described above with regard to FIG. 3.

In another embodiment, an imaging device may be set up separate from a vehicle, either on a bridge or remote from the bridge. In this example, the imaging device may be arranged to capture images of the vehicle and traffic markings as the vehicle crosses the bridge. A position of the vehicle on the bridge in each image may be determined using known techniques. For example, in an embodiment, the position of the vehicle may be determined based on its position relative to a traffic marking that is at a known location on the bridge. In another embodiment, the position of the vehicle may be determined based on a number of traffic markings that the vehicle has passed since a beginning point on the bridge. The position may be determined using a known distance between the traffic markings. Other imaging techniques may also be used.

Figure 5:
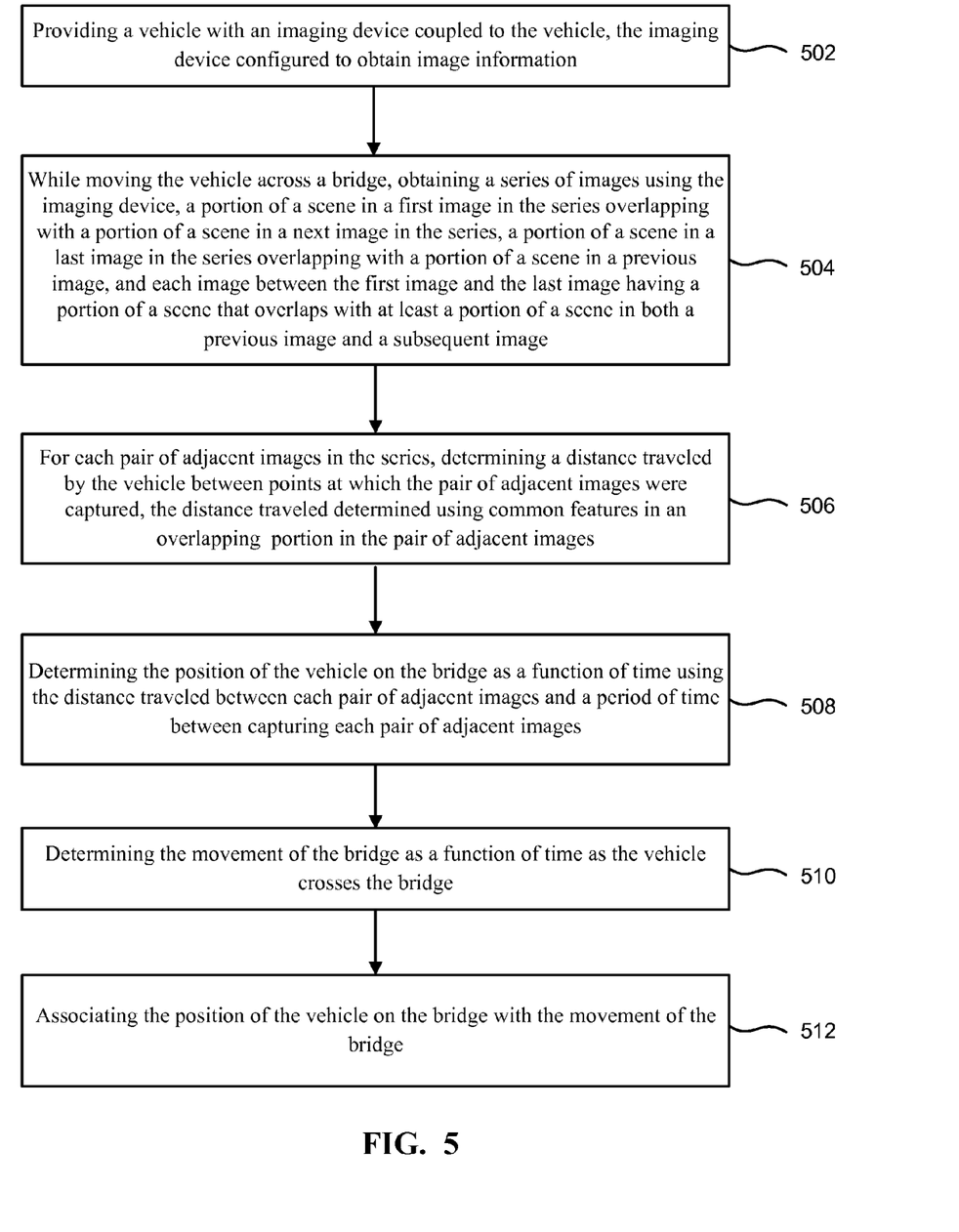
FIG. 5 is a flowchart providing a method of monitoring movement of a bridge based on a position of a vehicle crossing the bridge in accordance some embodiments.

FIG. 5 is a flowchart providing a method of monitoring movement of a bridge based on a position of a vehicle crossing the bridge in accordance some embodiments. The movement may include a vertical deflection or a frequency of deflection. The vehicle is provided with an imaging device coupled to the vehicle, where the imaging device is configured to obtain image information (502).

While moving the vehicle across the bridge, a series of images is obtained using the imaging device, where a portion of a scene in a first image in the series overlaps with a portion of a scene in a next image in the series, a portion of a scene in a last image in the series overlaps with a portion of a scene in a previous image, and each image between the first image and the last image has a portion of a scene that overlaps with at least a portion of a scene in both a previous image and a subsequent image (504).

For each pair of adjacent images in the series, a distance traveled by the vehicle between points at which the pair of adjacent images were captured is determined using common features in an overlapping portion in the pair of adjacent images (506).

In some embodiments, the imaging device may be coupled to the vehicle at a known height and arranged in a downward facing orientation. The imaging device may be calibrated so that the distance traveled by the vehicle between each pair of adjacent images may be determined based on a number of image pixels by which features move between the pair of adjacent images.

In other embodiments, traffic markings on the bridge have one or more known dimensions, and the imaging device may be arranged in a downward facing orientation so that portions of the traffic markings are captured in the series of images. The distance traveled by the vehicle between the points at which each pair of adjacent images are captured may be determined based on a change in position of the traffic markings between the pair of adjacent images. The traffic markings may include a centerline stripe, and the one or more known dimensions may include at least one of a length or width of the centerline stripe.

In yet other embodiments, the traffic markings on the bridge may have one or more known dimensions and spacings, and the imaging device may be arranged in a downward facing orientation so that portions of the traffic markings are captured in the series of images. The distance traveled by the vehicle between each pair of adjacent images may be determined based on a number of the traffic markings in the pair of adjacent images.

In still other embodiments, features on the bridge may have one or more known dimensions, and the imaging device may be arranged so that portions of the features are captured in the series of images. In some embodiments, the features may be disposed on a side rail of the bridge. In other embodiments, the features may comprise rails that are spaced at regular intervals across a length of the bridge. The distance traveled by the vehicle between each pair of adjacent images may be determined based on a change in position of the features between the pair of adjacent images.

The position of the vehicle on the bridge is determined as a function of time using the distance traveled between each pair of adjacent images and a period of time between capturing each pair of adjacent images (508).

In some embodiments, each image in the series of images may include a timestamp that may be used to determine the position of the vehicle on the bridge as the function of time. In other embodiments, each image in the series of images may be captured at a regular time interval, and the regular time interview may be used to determine the position of the vehicle on the bridge as the function of time.

The movement of the bridge is determined as a function of time as the vehicle crosses the bridge (510).

The position of the vehicle on the bridge is associated with the movement of the bridge (512).

Figure 6:
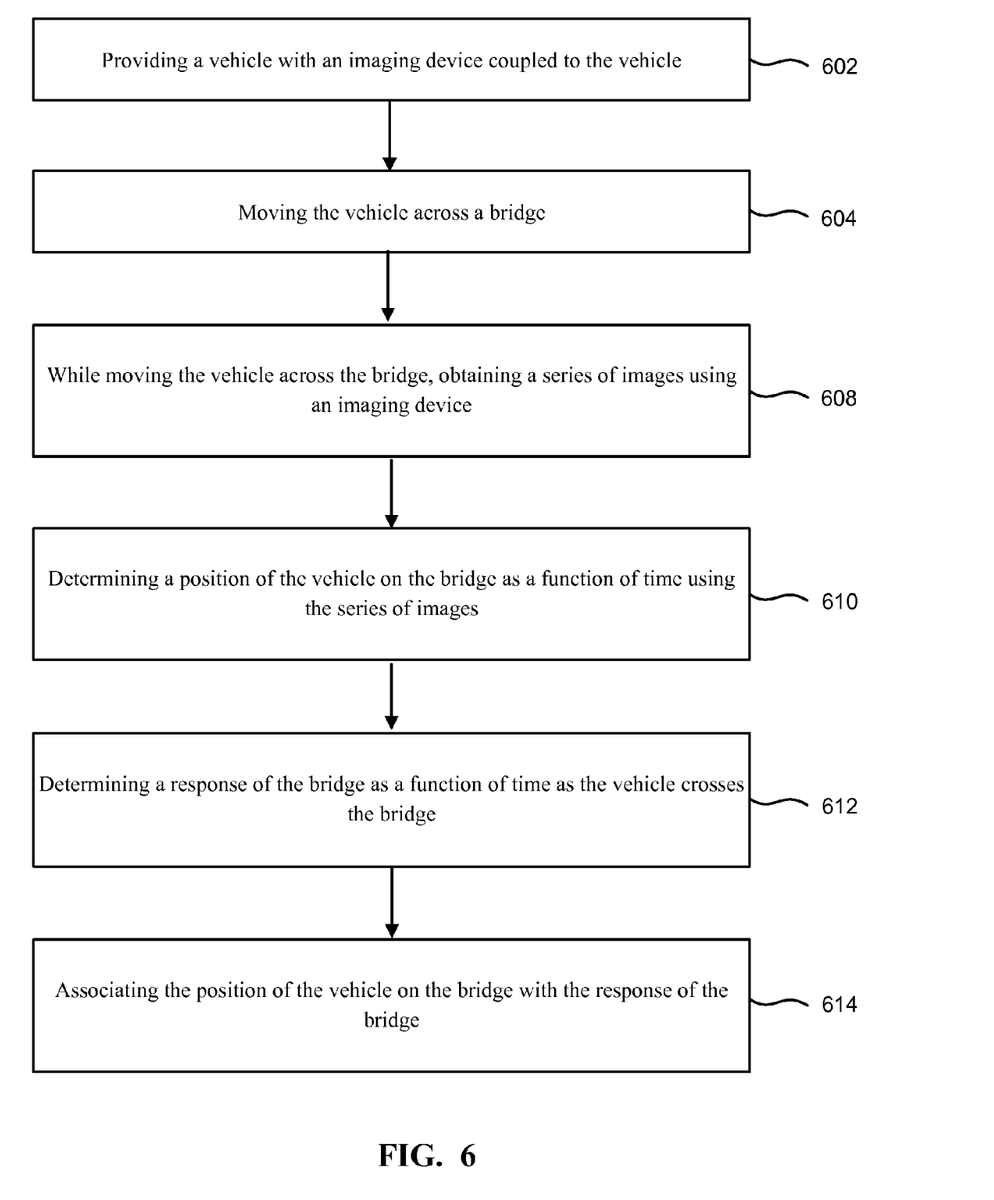
FIG. 6 is a flowchart providing a method for performing a dynamic load test on a bridge in accordance some embodiments.

FIG. 6 is a flowchart providing a method for performing a dynamic load test on a bridge in accordance some embodiments. A vehicle is provided with an imaging device coupled to the vehicle (602). The vehicle is moved across the bridge (604). While moving the vehicle across the bridge, a series of images is obtained using the imaging device (608). A position of the vehicle on the bridge is determined as a function of time using the series of images (610). A response of the bridge is determined as a function of time as the vehicle crosses the bridge (612). The position of the vehicle on the bridge is associated with the response of the bridge (614).

Figure 7:
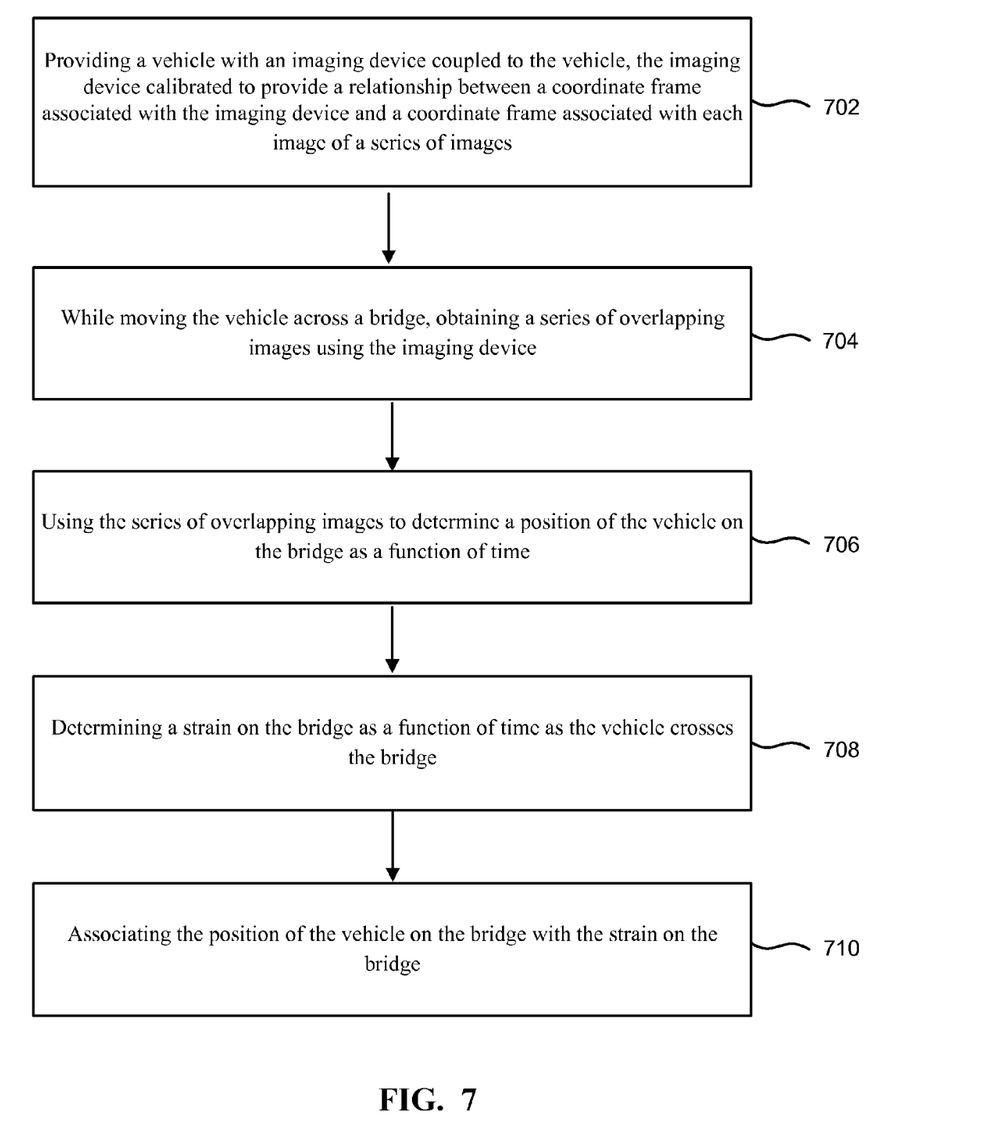
FIG. 7 is a flowchart providing a method of monitoring a strain on a bridge based on a position of a vehicle crossing the bridge in accordance some embodiments.

FIG. 7 is a flowchart providing a method of monitoring a strain on a bridge based on a position of a vehicle crossing the bridge in accordance some embodiments. The vehicle is provided with an imaging device coupled to the vehicle, where the imaging device is calibrated to provide a relationship between a coordinate frame associated with the imaging device and a coordinate frame associated with each image of a series of images (702). While moving the vehicle across the bridge, a series of overlapping images is obtained using the imaging device (704). The series of overlapping images is used to determine a position of the vehicle on the bridge as a function of time (706). The strain on the bridge is determined as a function of time as the vehicle crosses the bridge (708). The position of the vehicle on the bridge is associated with the strain on the bridge (710).

It should be appreciated that the specific steps illustrated in FIGS. 5-7 provide particular methods according to some embodiments. Other sequences of steps may also be performed according to alternative embodiments. For example, alternative embodiments may perform the steps outlined above in a different order. Moreover, the individual steps illustrated in FIGS. 5-7 may include multiple sub-steps that may be performed in various sequences. Furthermore, additional steps may be added or removed depending on the particular application.

It should be appreciated that some embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method of monitoring movement of a bridge based on a position of a vehicle crossing the bridge, the method comprising:
   providing the vehicle with an imaging device coupled to the vehicle, the imaging device configured to obtain image information;
   while the vehicle is moving across the bridge, obtaining a series of images using the imaging device, a portion of a scene in a first image in the series overlapping with a portion of a scene in a next image in the series, a portion of a scene in a last image in the series overlapping with a portion of a scene in a previous image, and each image between the first image and the last image having a portion of a scene that overlaps with at least a portion of a scene in both a previous image and a subsequent image;
   for each pair of adjacent images in the series, determining a distance traveled by the vehicle between points at which the pair of adjacent images were captured, the distance traveled determined using common features in an overlapping portion in the pair of adjacent images;
   determining the position of the vehicle on the bridge as a function of time using the distance traveled between each pair of adjacent images and a period of time between capturing each pair of adjacent images;
   determining the movement of the bridge as a function of time as the vehicle crosses the bridge; and
   associating the position of the vehicle on the bridge with the movement of the bridge.

2. The method of claim 1 wherein the imaging device is coupled to the vehicle at a known height and arranged in a downward facing orientation, and the imaging device is calibrated so that the distance traveled by the vehicle between each pair of adjacent images is determined based on a number of image pixels by which features move between the pair of adjacent images.

3. The method of claim 1 wherein traffic markings on the bridge have one or more known dimensions, and the imaging device is arranged in a downward facing orientation so that portions of the traffic markings are captured in the series of images, and the distance traveled by the vehicle between the points at which each pair of adjacent images are captured is determined based on a change in position of the traffic markings between the pair of adjacent images.

4. The method of claim 3 wherein the markings include a centerline stripe, and the one or more known dimensions include at least one of a length or width of the centerline stripe.

5. The method of claim 1 wherein traffic markings on the bridge have one or more known dimensions and spacings, and the imaging device is arranged in a downward facing orientation so that portions of the traffic markings are captured in the series of images, and the distance traveled by the vehicle between each pair of adjacent images is determined based on a number of the traffic markings in the pair of adjacent images.

6. The method of claim 1 wherein features on the bridge have one or more known dimensions, and the imaging device is arranged so that portions of the features are captured in the series of images, and the distance traveled by the vehicle between each pair of adjacent images is determined based on a change in position of the features between the pair of adjacent images.

7. The method of claim 6 wherein the features are disposed on a side rail of the bridge, and the imaging device is arranged to capture at least a portion of the features as the vehicle crosses the bridge.

8. The method of claim 6 wherein the features comprise rails that are spaced at regular intervals across a length of the bridge.

9. The method of claim 1 wherein the movement of the bridge includes a vertical deflection of the bridge.

10. The method of claim 1 wherein the movement of the bridge includes a frequency of deflection.

11. The method of claim 1 wherein each image in the series of images includes a timestamp that is used to determine the position of the vehicle on the bridge as the function of time.

12. The method of claim 1 wherein each image in the series of images is captured at a regular time interval, and the regular time interview is used to determine the position of the vehicle on the bridge as the function of time.

13. A method for performing a dynamic load test on a bridge, the method comprising:
   providing a vehicle with an imaging device coupled to the vehicle;
   while the vehicle is moving across the bridge, obtaining a series of images using the imaging device;
   for each pair of adjacent images in the series, determining a distance traveled by the vehicle between points at which the pair of adjacent images were captured;
   determining a position of the vehicle on the bridge as a function of time using the distance traveled between the points and a period of time between capturing each pair of adjacent images;

determining a response of the bridge as a function of time as the vehicle crosses the bridge; and associating the position of the vehicle on the bridge with the response of the bridge.

14. The method of claim 13 wherein at least one image in the series of images includes an object indicating a start point near a beginning of the bridge, and at least one image in the series of images includes an object indicating a stop point near an end of the bridge, and some of the images in the series include markings that either have one or more known dimensions or are spaced by a known distance, and the position of the vehicle on the bridge as a function of time is determined based on a number of the markings in the series of images between the at least one image that includes the object indicating the start point and each subsequent image in the series of images.

15. The method of claim 13 wherein each image in the series of images includes a timestamp, and the timestamp is used to determine the position of the vehicle on the bridge as a function of time.

16. The method of claim 13 wherein the imaging device is coupled to the vehicle at a known height and arranged in a downward facing orientation, and the imaging device is calibrated to provide a relationship between a coordinate frame associated with the imaging device and a coordinate frame associated with each image of the series of images.

17. The method of claim 13 wherein traffic markings on the bridge have one or more known dimensions, and the imaging device is arranged in a downward facing orientation so that portions of the traffic markings are captured in the series of images and the position of the vehicle on the bridge is determined based on a change in position of the traffic markings in each pair of adjacent images.

18. The method of claim 13 wherein the response of the bridge includes a deflection of the bridge.

19. The method of claim 13 wherein the response is determined using one or more strain gauges coupled to the bridge.

20. A method of monitoring a strain on a bridge based on a position of a vehicle crossing the bridge, the method comprising:

providing the vehicle with an imaging device coupled to the vehicle, the imaging device calibrated to provide a relationship between a coordinate frame associated with the imaging device and a coordinate frame associated with each image of a series of images;

while the vehicle is moving across the bridge, obtaining a series of overlapping images using the imaging device;

for each pair of adjacent images in the series, determining a distance traveled by the vehicle between points at which the pair of adjacent images were captured;

using the distance traveled by the vehicle between the points and a period of time between capturing each pair of adjacent images to determine a position of the vehicle on the bridge as a function of time;

determining the strain on the bridge as a function of time as the vehicle crosses the bridge; and associating the position of the vehicle on the bridge with the strain on the bridge.

* * * * *